(12) United States Patent
Millet et al.

(10) Patent No.: US 9,389,137 B2
(45) Date of Patent: Jul. 12, 2016

(54) PRESSURISED HOT AIR DUCT OF AN AIRCRAFT EQUIPPED WITH A DEVICE FOR DETECTING AIR LEAKAGE

(75) Inventors: Gerard Millet, Pibrac (FR); Xavier Bernard, Bruges (FR); Matthias Noecker, Tournefeuille (FR)

(73) Assignees: AIRBUS OPERATIONS (SAS), Toulouse (FR); AIRBUS OPERATIONS GMBH, Hamburg (DE)

( * ) Notice: Subject to any disclaimer, the term of this patent is extended or adjusted under 35 U.S.C. 154(b) by 392 days.

(21) Appl. No.: 13/548,380

(22) Filed: Jul. 13, 2012

(65) Prior Publication Data

US 2013/0014840 A1    Jan. 17, 2013

(30) Foreign Application Priority Data

Jul. 13, 2011  (FR) ...................................... 11 56416

(51) Int. Cl.
*F16L 55/00* (2006.01)
*G01M 3/04* (2006.01)
*G01M 3/00* (2006.01)

(52) U.S. Cl.
CPC .............. *G01M 3/045* (2013.01); *G01M 3/002* (2013.01); *Y10T 137/8158* (2015.04)

(58) Field of Classification Search
CPC ..... F16L 2201/30; G01M 3/18; G01M 3/045; G01M 3/002
USPC ................. 138/101, 104, 114, 149, 148, 113; 73/49.1, 40.5 R, 40.7, 46, 49.5, 49.8
See application file for complete search history.

(56) References Cited

U.S. PATENT DOCUMENTS

| 2,894,537 | A | * | 7/1959 | Carr ........................ F16L 9/18 138/114 |
| 2,897,537 | A | * | 8/1959 | Schmidt, Jr .................... 452/128 |
| 3,485,085 | A | * | 12/1969 | Hawkins, Jr. ......... G01M 3/045 324/696 |
| 3,882,382 | A | * | 5/1975 | Johnson ............... G01N 27/048 138/104 |
| 4,033,381 | A | * | 7/1977 | Newman et al. ............... 138/113 |
| 4,288,654 | A | * | 9/1981 | Blom et al. ...................... 174/47 |
| 4,615,359 | A | * | 10/1986 | Affa et al. ...................... 138/104 |
| 4,691,741 | A | * | 9/1987 | Affa et al. ...................... 138/113 |
| 4,817,672 | A | * | 4/1989 | Broodman .................... 138/113 |
| 4,922,971 | A | * | 5/1990 | Grantham ........................ 141/1 |
| 5,176,025 | A | * | 1/1993 | Butts .......................... 73/40.5 R |
| 5,803,127 | A | * | 9/1998 | Rains ............................ 138/113 |

(Continued)

FOREIGN PATENT DOCUMENTS

WO    2007/042277 A1    4/2007

OTHER PUBLICATIONS

French Search Report, dated Feb. 14, 2012 from corresponding French application.

*Primary Examiner* — Paul R Durand
*Assistant Examiner* — Charles P Cheyney
(74) *Attorney, Agent, or Firm* — Young & Thompson (57) ABSTRACT

A pipe (50) that makes it possible to channel pressurized air into an aircraft, includes an inner tube (52), an outer tube (54) that is essentially coaxial to the inner tube (52), an insulating material (56) that is inserted between the two tubes (52, 54) and that is made of a heat-insulating and gas-porous material, and a leak detection device (70), characterized in that the leak detection device (70) is arranged at least in part between the inner tube (52) and the outer tube (54) and in that at least at one end (60), the detection device follows a concentric trajectory (84) to the inner tube (52).

16 Claims, 8 Drawing Sheets

(56) References Cited

U.S. PATENT DOCUMENTS

| | | | |
|---|---|---|---|
| 5,971,029 A * | 10/1999 | Smith et al. | 138/98 |
| 7,960,978 B2 * | 6/2011 | Keyes | 324/694 |
| 8,289,173 B2 * | 10/2012 | Ben-Mansour et al. | 340/605 |
| 8,479,565 B2 * | 7/2013 | Izumo et al. | 73/40.5 R |
| 8,746,041 B2 * | 6/2014 | Howard et al. | 73/46 |
| 8,789,562 B2 * | 7/2014 | Kagoura | 138/104 |
| 2009/0127848 A1 * | 5/2009 | Carns et al. | 285/55 |
| 2010/0037974 A1 * | 2/2010 | Fernandes et al. | 138/141 |
| 2012/0167669 A1 * | 7/2012 | Raghavendra | G01M 3/047 73/40.5 R |
| 2012/0175005 A1 * | 7/2012 | Andersen | 138/104 |
| 2013/0220466 A1 * | 8/2013 | Zandiyeh | G01M 3/047 138/104 |

\* cited by examiner

PRESSURISED HOT AIR DUCT OF AN AIRCRAFT EQUIPPED WITH A DEVICE FOR DETECTING AIR LEAKAGE

BACKGROUND OF THE INVENTION

1. Field of the Invention

This invention relates to a pressurized hot air pipe of an aircraft that is equipped with a leak detection device as well as a segment of said pipe.

2. Description of the Related Art

Figure 1:
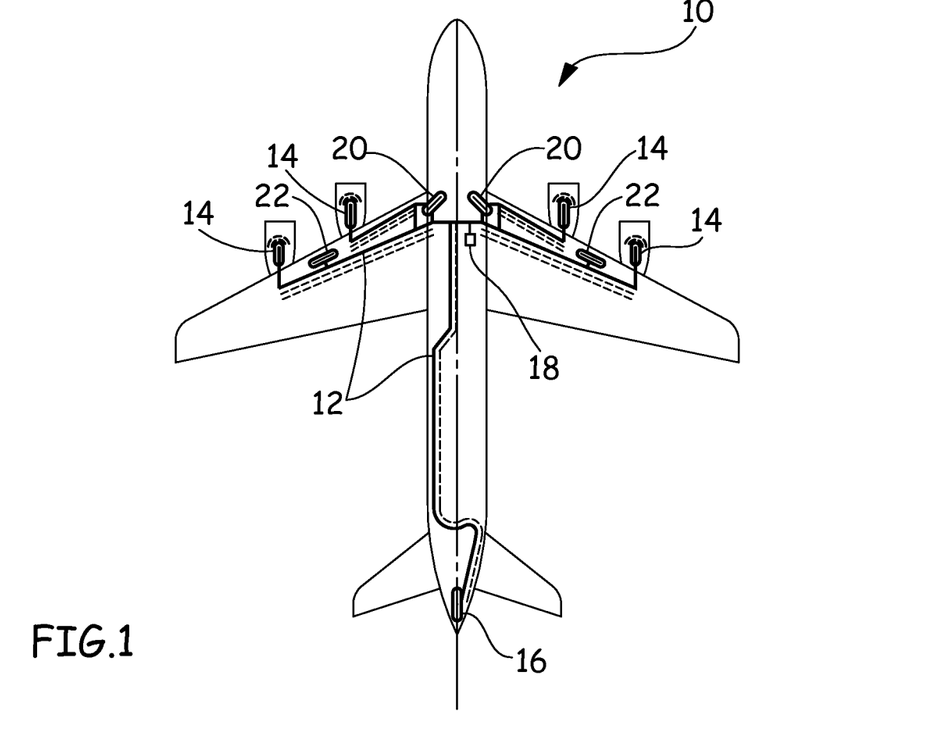
FIG. 1 is a diagrammatic view of an aircraft that illustrates pressurized air sources connected via a network of pipes to systems that use the pressurized air.

At 10, FIG. 1 shows an aircraft that integrates different sources of pressurized air that are connected, by a pipe network 12, to systems that have pressurized air requirements.

The engines 14 as well as the auxiliary power group 16 constitute pressurized hot-air sources that are integrated into the aircraft. The latter can also comprise means 18 for connecting an externally pressurized air source, whereby said means 18 are located under the aircraft for supplying it with pressurized air when it is on the ground.

As a system that uses pressurized air, the aircraft comprises, i.a., air-conditioning systems 20, wing-defrosting systems 22, ventilation systems, engine-starting systems, and the fuel-tank pressurization system.

Figure 2:
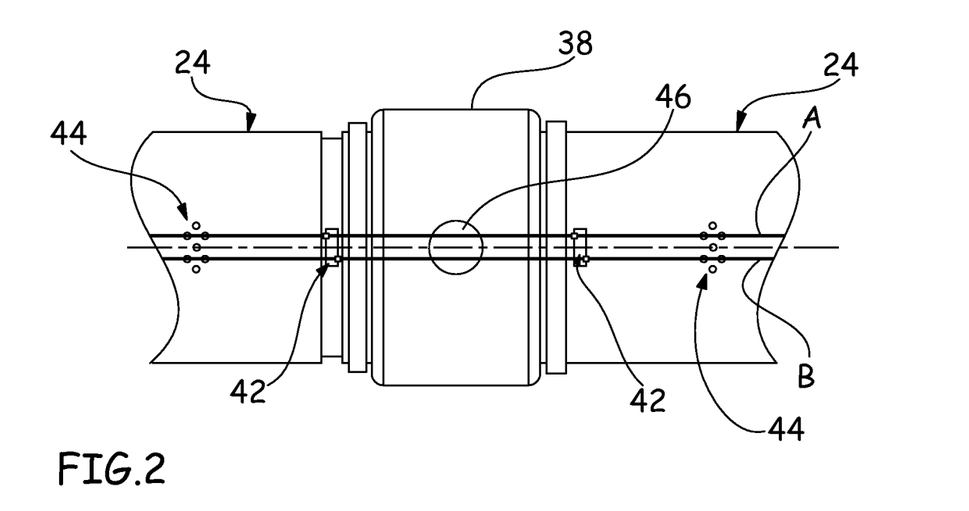
FIG. 2 is a side view that illustrates a leak detection device that is connected to a pipe according to the prior art.
Figure 3:
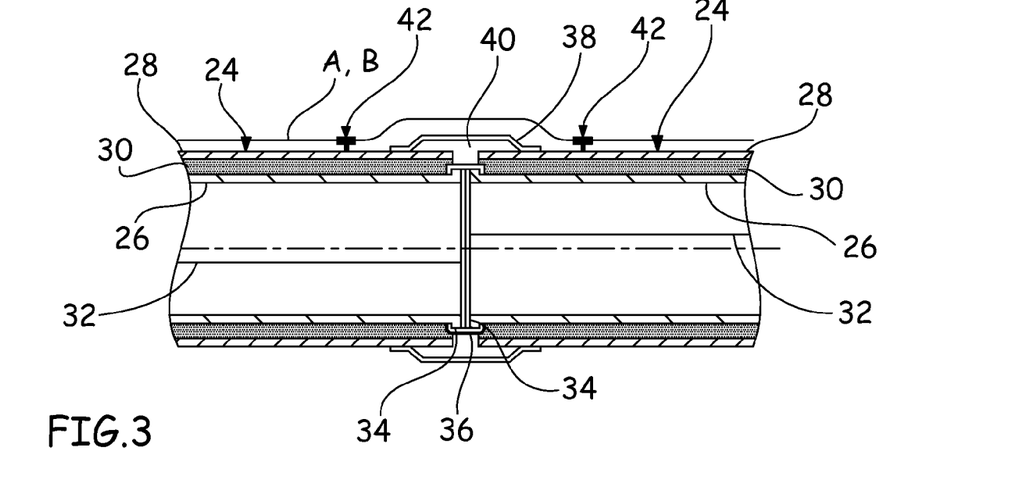
FIG. 3 is a cutaway that illustrates a leak detection device that is connected to a pipe according to the prior art.
Figure 4:
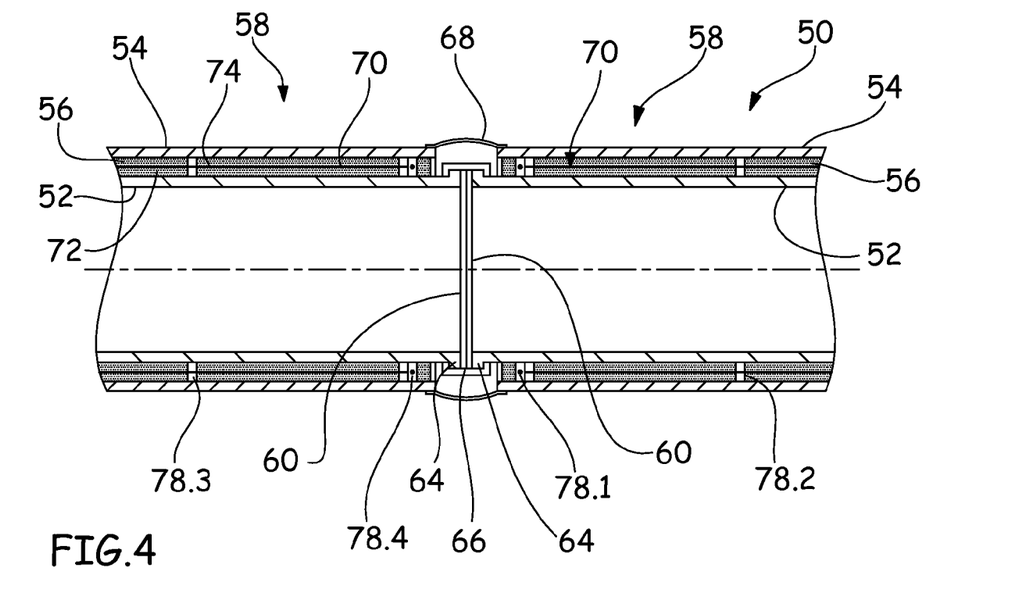
FIG. 4 is a cutaway that illustrates a leak detection device that is connected to a pipe according to the invention.

FIGS. 2 and 3 show a portion of a pipe that makes it possible to channel the pressurized air from a source up to a system that uses it. This pipe consists of segments 24 placed end to end. Each segment 24 comprises an inner tube 26, an outer tube 28 that is essentially coaxial to the first, and heat-insulating material 30 that is inserted between the tubes 26 and 28.

According to one embodiment, the inner tube 26 is obtained from one or more flat panels, made in particular of titanium, shaped, and then welded on one or more generatrices 32. The inner tubes 26 comprise collars 34 at each end.

The insulating material 30 can be based on glass wool.

The outer tube 28 comes in the form of a sheet, made in particular of titanium, connected to the insulating material.

To ensure the connection between two adjacent segments placed end to end, a clamp 36 is used that clamps the collars 34.

Each junction zone is insulated by connecting a sleeve 38, astride two segments, with the ends of the sleeve 38 clamping the outer tubes 28 in such a way as to produce an essentially airtight connection between the outer tubes 28 and the sleeve 38. Thus, the sleeve 38 and the ends of the inner tubes 26 border an annular chamber 40.

According to one embodiment, the wall of the sleeve is flexible and comprises an insulating material that is bagged between two films made of plastic material.

Advantageously, a pipe that channels pressurized hot air comprises a leak detection device that makes it possible to indicate the presence of an air leak, advantageously its location, so as to warn of risks of damage to the structure of the aircraft or elements that are present in the environment of this possible leak because of the high temperature of the pressurized air.

This detection device comprises at least one long-member detection element A that consists of heat-sensitive sensors, connected in series, arranged outside of the outer tubes 28.

The long-member detection element A is semi-rigid and can be twisted so as to adapt its shape to the desired detection path.

According to one embodiment, the sensors have a resistance that varies based on temperature. In the absence of a leak, the potential that is measured at a first end of the loop is identical to the potential that is measured at the other end. In the presence of a leak, the potentials are different.

The positioning of the leak can be determined based on the ratio between the two potentials. Thus, $V1/V2=y/x$, with V1 being the potential measured at the first end, V2 the potential measured at the second end, x the distance separating the leak from the first end, and y the distance separating the leak from the second end.

Advantageously, the detection system comprises two detection elements A and B that are parallel and face in opposite directions so as to be able to easily locate the leak.

For optimal operation, the detection elements A and B are arranged at a certain distance from the outer tube 28. Consequently, these detection elements A and B are connected to the tube by braces 42 that are distributed along the path of the detection elements A and B that suitably position the detection element(s) relative to the outer tube 28. According to one embodiment, each brace 42 comprises a sleeve into which the detection element passes and a base that is attached to the outside surface of the outer tube 28. Taking into account the embodiment of the pipe, the zones where the leaks can potentially appear are essentially junction zones between the segments and optionally along the weld beads of the generatrix or generatrices 32 of the inner tube 26.

To detect a leak at the generatrix or generatrices 32, the outer tube comprises openings 44 or groups of small openings close to the generatrix or generatrices 32, and the detection elements are arranged outside of the outer tube perpendicular to the openings 44.

To detect a leak at junction zones, each sleeve 38 comprises at least one opening 46. In the case of a leak at the connection between two segments, pressurized hot air escapes into the annular chamber 40 and then via the opening 46. Regardless of the angular position of the leak at the junction, the opening 46 makes it possible to channel the hot air in the direction of the detection element(s).

So that this leak is detected, it is necessary that a portion of the detection element or a portion of each detection element passes above the opening 46. Close to each opening 46, the braces 42 that are used to hold the detection element(s) A and B are arranged outside of the zones covered by the sleeve 38 so as not to perforate it, although they are relatively distant from the opening 46.

This arrangement of the detection device cannot be completely satisfactory for the following reasons:

According to a first drawback, a brace 42 can be arranged at the openings 44 and may obstruct them, which tends to reduce the capacities of the detection element to detect a leak that can appear at these openings. According to another drawback, it may prove difficult to arrange the detection element (s) A and B correctly relative to the opening 46. On the one hand, it is difficult to preserve the alignment between the detection element A or B and the openings 46. If the detection element A or B is not aligned, it is possible to correct this poor alignment by deforming the detection element A or B in such a way that a portion is arranged facing the opening 46. However, taking into account how far away the braces 42 are, the path followed by the detection element may be accidentally modified and may no longer pass facing the opening 46.

On the other hand, to ensure an optimal operation of the leak detection system, it is necessary that the detection elements be arranged at an optimal distance from the opening 46. To correct this spacing, it is possible to deform the detection element A or B in such a way that the distance separating it from the opening is optimal. However, as above, taking into account how far away the braces 42 are, the path taken by the detection element may be accidentally modified and the spacing between the loop and the opening 46 may no longer be optimal.

According to a last drawback, in certain situations, it may not be possible to provide an opening 46 at the sleeve 38, in particular if the surrounding elements are heat-sensitive. In this case, it is not possible to detect a possible leak at the junction that is covered by a sleeve without an opening 46.

SUMMARY OF THE INVENTION

Also, the purpose of this invention is to eliminate the drawbacks of the prior art by proposing a detection device that makes it possible to optimize the detection of a leak from a pressurized hot-air pipe.

For this purpose, the invention has as its object a pipe that makes it possible to channel the pressurized air into an aircraft, whereby said pipe comprises an inner tube, an outer tube that is essentially coaxial to the inner tube, an insulating material that is inserted between the two tubes and that is made of a heat-insulating and gas-porous material, and a leak detection device, characterized in that the leak detection device is arranged at least in part between the inner tube and the outer tube and in that at least at one end, the detection device follows a trajectory that is concentric to the inner tube.

BRIEF DESCRIPTION OF THE DRAWING FIGURES

Other characteristics and advantages will emerge from the following description of the invention, a description that is provided only by way of example, relative to the accompanying drawings in which.

DETAILED DESCRIPTION OF THE INVENTION

FIGS. 4, 5, 9 and 11 show a pipe 50 that makes it possible to channel the pressurized hot air into an aircraft. In a known manner, this pipe 50 comprises an inner tube 52, an outer tube 54 that is essentially coaxial to the inner tube 52, and insulating material 56 that is inserted between the two tubes 52 and 54. In general, the pipe 50 comprises several segments 58 that are placed end to end.

In all of the cases, a pipe or a segment 50 comprises at least one protruding end 60 that is connected to another pipe or another segment.

Figure 5:
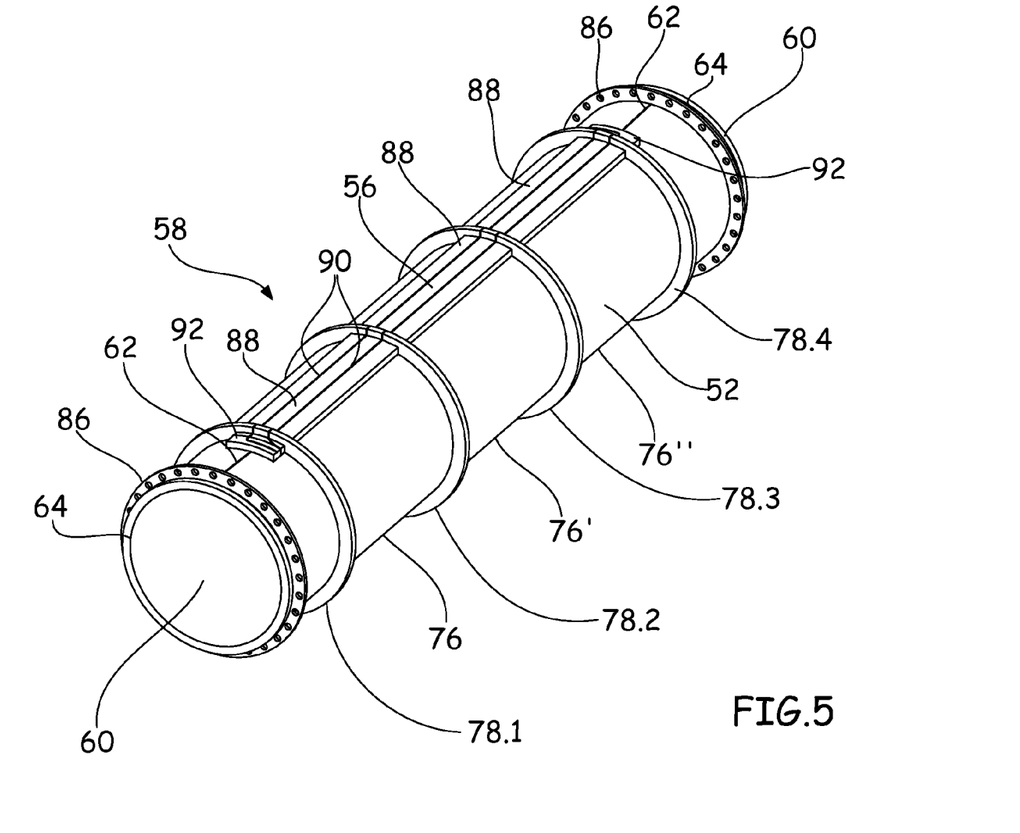
FIG. 5 is a perspective view of an inner tube of a segment prior to the installation of one or more detection elements according to the invention.
Figure 8:
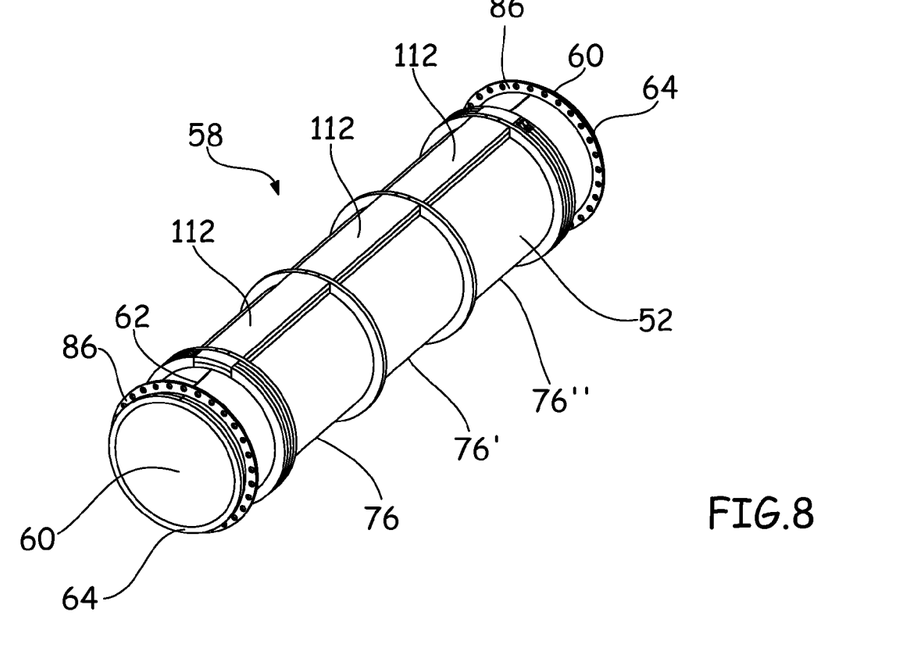
FIG. 8 is a perspective view that illustrates a pipe segment according to a variant of the invention that is equipped with at least one detection element.

According to one embodiment, the inner tube 52 is obtained from at least one flat panel, made in particular of titanium, shaped and then welded on at least one generatrix 62 (visible in FIGS. 5 and 8).

The insulating material 56 can be based on glass wool. In all of the cases, it should be made of a heat-insulating and gas-porous material.

The outer tube 54, also called outer jacket, comes in the form of a sheet, made in particular of titanium, connected to the insulating material.

The end 60 is connected to another pipe or another segment by any suitable means. According to one embodiment, the end of the inner tube 52 comprises a collar 64. Advantageously, the two ends of the inner tube 52 of the segments each comprise a collar 64. To ensure the connection, a clamp 66 clamps the collars 64, as illustrated in FIG. 12B.

In a known manner, each junction zone is insulated by connecting a sleeve 68, astride two segments, with the ends of the sleeve 68 clamping the outer tubes 54 in such a way as to obtain an essentially airtight connection between the outer tubes 54 and the sleeve 68. According to one embodiment, the wall of the sleeve is flexible and comprises an insulating material that is bagged between two films made of plastic material.

To detect a possible leak of hot air, the pipe 50 comprises a leak detection device 70. In a known manner, the leak detection device 70 comprises at least one detection element A and preferably two detection elements A and B, essentially identical to those of the prior art.

The tubes, the connection means of the segments, as well as the detection elements A and B are not presented in more detail because they are known to one skilled in the art.

According to a characteristic of the invention, the leak detection device 70 is arranged at least in part between the inner tube 52 and the outer tube 54 and extends over almost the entire length of the pipe or the segment.

For each segment, the leak detection device 70 is arranged between the inner tube 52 and the outer tube 54 close to a generatrix 62 at the level of which leaks are likely to appear.

Figure 7A:
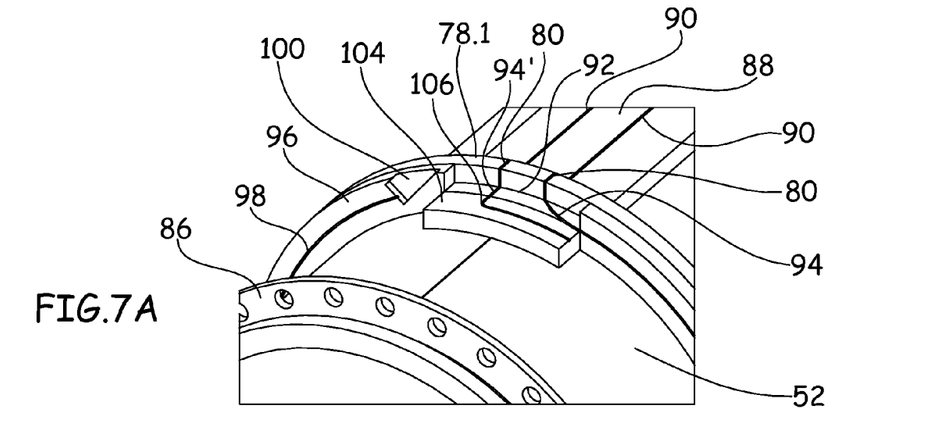
FIGS. 7A and 7E are perspective views that illustrate the installation of insulating elements that are provided for positioning one or more detection elements according to a variant of the invention.
Figure 7B:
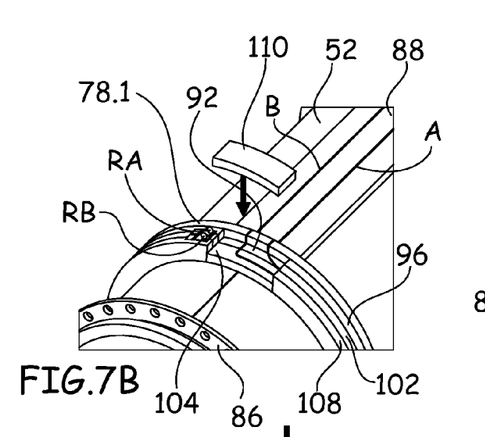

Advantageously, the leak detection device is arranged essentially parallel to the outside surface of the inner tube 52. For this purpose, a layer of insulating material 72 with an essentially constant thickness is inserted between the outside surface of the inner tube 52 and the detection device, as illustrated in FIG. 5. Preferably, the leak detection device 70 is inserted between two layers of insulating material 72 and 74 that fill in the space between the inner tube 52 and the outer tube 54, as illustrated in FIGS. 7D and 7E. These layers 72 and 74 may or may not have the same thickness.

Figure 6:
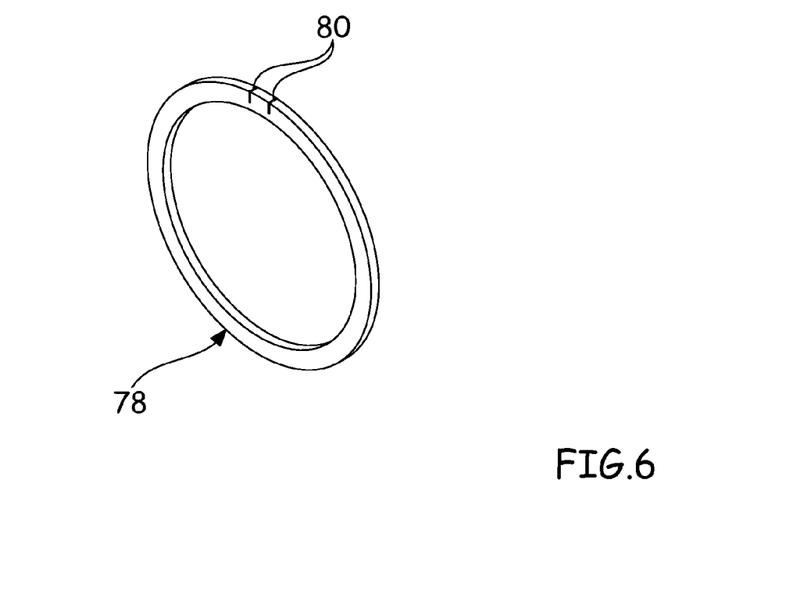
FIG. 6 is a perspective view of a ring that makes it possible to partition the space between the inner tube and the outer tube in several chambers.

To facilitate the location of the leak, the volume that is delimited by the inner tube 52 and the outer tube 54 is partitioned in successive annular chambers 76, 76', 76'', visible in FIG. 7, separated by annular partitions 78.1 to 78.4 that are made of insulating material and are essentially airtight. The height of each annular partition 78 is essentially identical to the distance that separates the inner tube 52 and the outer tube 54. Advantageously, each annular partition 78 comprises at least one slot 80 that extends from the inside edge or the outside edge of the annular partition over only a portion of its height. This slot 80 makes possible the passage of the detection element A or B. The annular partition 78 comprises as many slots 80 as the leak detection device comprises detection elements. In the example, illustrated in FIG. 6, the annular partition 78 comprises two slots 80.

For each segment, the detection device extends between the inner tube 52 and outer tube 54 between the annular end partitions 78.1 and 78.4.

Figure 11:
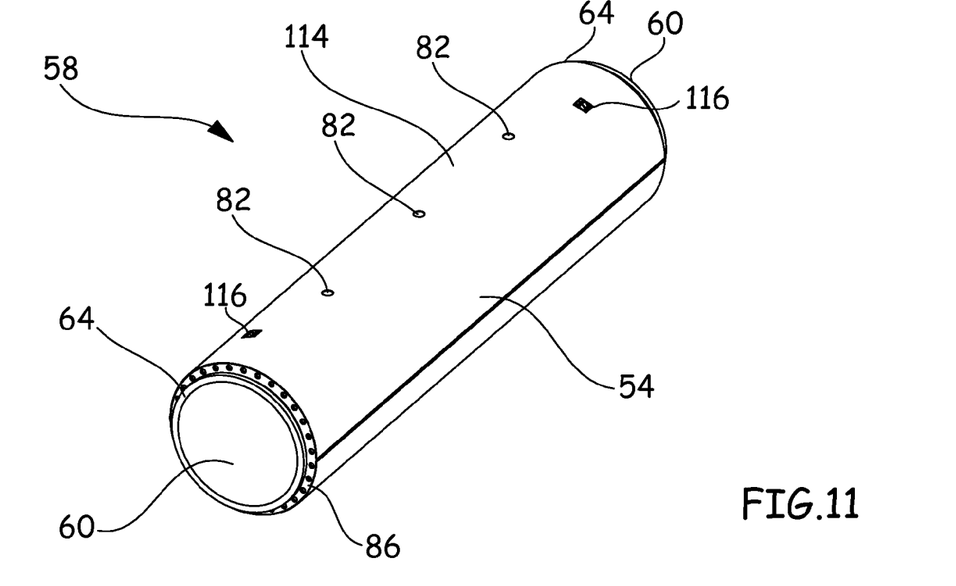
FIG. 11 is a perspective view of a finished segment according to the invention.

Preferably, for each chamber 76, the outer tube 54 comprises an opening 82 to link the chamber with the outside to limit the risks of excessive pressure in the chamber in the case of a leak, as illustrated in FIG. 11.

According to a characteristic of the invention, to detect a leak at the level of a junction between two segments or the pipe with another element, the leak detection device follows a concentric trajectory 84 to the inner tube 52 that extends over the circumference of the inner tube 52, preferably at an essentially constant distance from the outside surface of the inner tube and at an essentially constant distance from the end of the pipe and/or the segment.

Figure 7C:
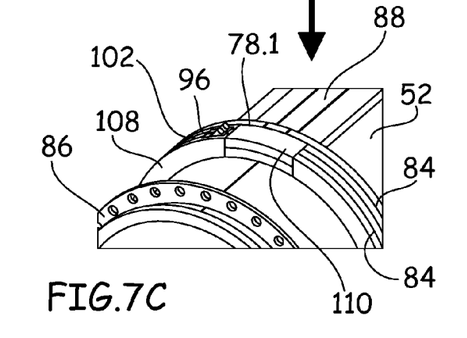
Figure 7D:
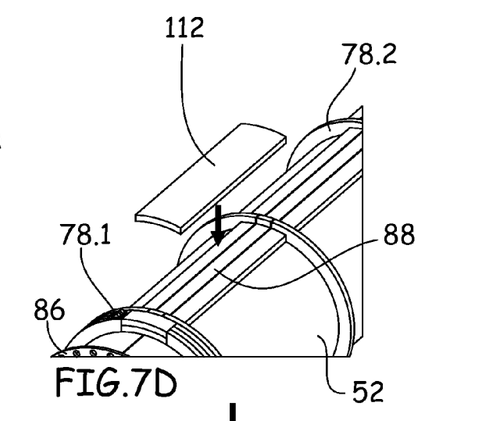
Figure 7E:
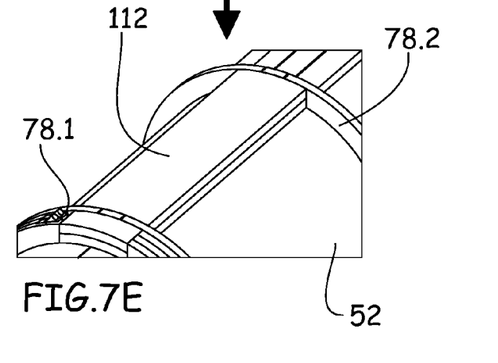

When the leak detection device comprises two detection elements A and B, each of them forms a concentric loop 84, as illustrated in FIG. 7C.

For each segment, the detection device extends between the inner tube 52 and the outer tube 54 along an essentially rectilinear trajectory between the annular end partitions 78.1 and 78.4 and forms at least one loop that is concentric to the inner tube, at each end, between the end and the annular end partition 78.1 or 78.2.

Preferably, a ring 86 that is concentric to the inner tube 52 is inserted between the inner tube 52 and the outer tube 54 and between the end of the segment or the pipe and the concentric loop(s) 84. This ring 86 comprises a number of openings that are distributed over its circumference that make it possible for hot air, in the case of a leak, to flow in the direction of the leak detection device by passing through said ring 86.

According to the invention, the arrangement of the detection device around the inner pipe 52 makes it possible to detect a leak at a junction regardless of the angular position of the leak. Thus, it is no longer necessary to provide an opening at the sleeve to channel the hot air in the direction of the detection device.

According to another advantage, the leak detection device is protected by being arranged under the outer tube, and its position may not be accidentally modified contrary to the prior art that provides a detection device outside of the outer tube.

According to a characteristic of the invention, for each segment, the leak detection device comprises at least one threadlike detection element with connecting means at each end. Preferably, each segment comprises two detection elements A and B with a connecting means RA at a first end, another connecting means RA' at the other end for the element A, a connecting means RB at a first end, and another connecting means RB' at the other end for the element B. These detection elements and their connecting means are not described in more detail because they are known to one skilled in the art and could be essentially identical to the detection elements of the detection devices of the prior art.

According to another characteristic of the invention, the insulating material 56 is used for positioning the leak detection device.

For this purpose, as illustrated in FIG. 5, the insulating material comprises at least one plate 88 (which forms a portion of the first layer 72) that is connected to the outside surface of the inner tube 52 at the rectilinear portions of the detection device. In the presence of annular partitions 78.1 and 78.4, the insulating material comprises as many rectilinear plates 88 as chambers 76. Advantageously, the plates 88 comprise at least one furrow 90, one for each detection element A or B, to guide them. These furrows 90 are aligned with the slots 80 of the annular partitions 78.1 to 78.4.

For each segment, the closest annular partitions 78.1 and 78.4 of the ends are arranged at a distance on the order of 5 to 25 cm from said ends.

For each end, a plate 92 of insulating material (which also forms a portion of the first layer 72) is provided flattened against the outside surface of the inner tube 52 and adjacent to the surface of the annular partition 78.1 or 78.4 that is oriented toward the end. This plate 92 comprises at least one furrow 94 that makes it possible to follow a curved trajectory to a detection element A of the leak detection device. According to the embodiment, illustrated in FIG. 7A, the plate 92 comprises a first curved furrow 94 for the detection element A and a rectilinear furrow 94' for the detection element B.

In addition, as illustrated in FIG. 7A, the insulating material 56 comprises a first ring 96 that extends over the entire circumference of the inner tube 52 except for the portion covered by the plate 92. This first ring 96 comprises a surface that is placed against the surface of the annular portion 78.1 or 78.2 that is oriented toward the end, with the opposite surface comprising a furrow 98 for guiding a detection element. This first ring preferably comprises a recess 100 for at least partially housing a means for connecting a detection element.

After the installation of these elements of the insulating material 56, a detection element A is installed.

Next, for each end, a second ring 102 is placed against the first ring 96 to keep the detection element A in the furrow 98. Preferably, the second ring 102 comprises a furrow that is complementary to the furrow 98 of the first ring 96, with the furrows each having a half-disk-shaped cross-section. It also comprises a recess that is complementary to the recess 100 of the first ring 96 to house—at least partially—a connecting means of the detection element A.

In the presence of two detection elements A and B, at each end, the insulating material 56 comprises a plate 104 (which also forms a portion of the first layer 71) that is arranged in the extension of the plate 92 with a furrow 106 with a curved trajectory. In this case, the second ring 102 comprises, at its surface that is oriented toward the end, a furrow that is identical to the furrow 98 for housing the second detection element B and preferably a recess that is identical to the recess 100. As a variant, the plates 92 and 104 can be produced in a single piece.

After the installation of these elements of the insulating material 56, a detection element B is installed.

Next, for each end, a third ring 108 is adjacent to the second ring 102 to hold the detection element B. This third ring 108 comprises a furrow that is complementary to the furrow of the second ring 102 for housing the detection element B and, preferably, a recess that is complementary to the recess of the second ring for partially housing the connecting means RB or RB'. A segment as illustrated in part in FIG. 7B is then obtained. The plates 92 and 104 are covered with a plate 110 at each end in such a way as to obtain a segment as illustrated in FIG. 7C.

Plates 112 that form a portion of the second layer 74 cover the plates 88, as illustrated in FIGS. 7D and 7E.

Thus, at the level of its rectilinear path, the detection device is inserted between two layers, each of them consisting of several juxtaposed plates, at least one of the layers comprising at least one furrow for housing the detection device. At the level of the concentric trajectory, the detection device is inserted between rings, at least one of them comprising a furrow for housing the detection device at the level of one of the surfaces that are perpendicular to the longitudinal direction of the tubes.

Figure 9:
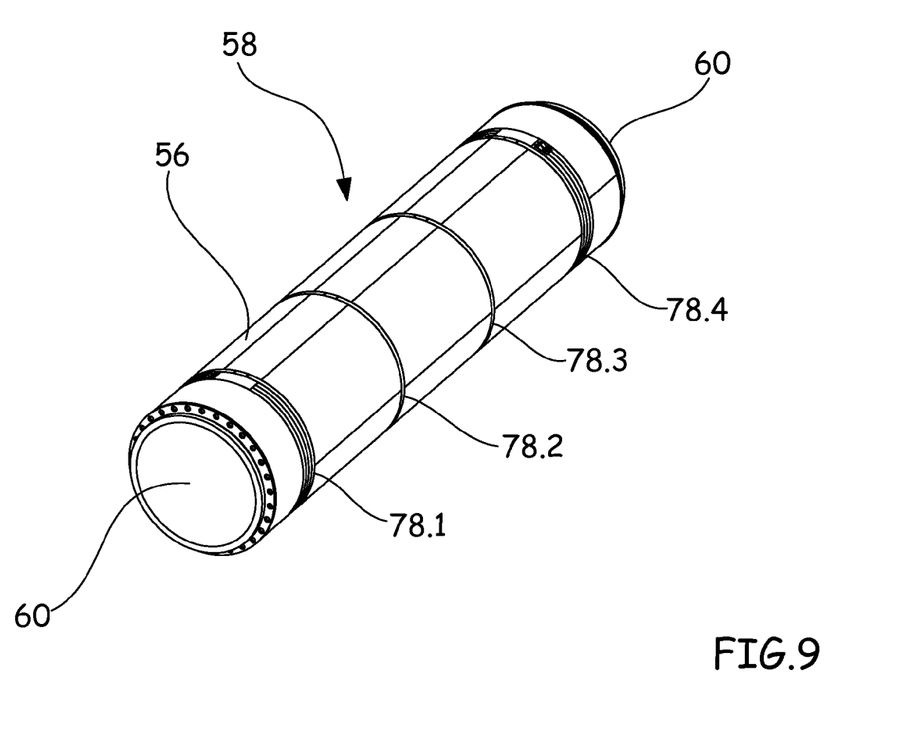
FIG. 9 is a perspective view that illustrates the segment of FIG. 8 after the installation of the insulating material.

A segment as illustrated in FIG. 8 is then obtained. Next, the rest of the insulating material 56 is installed in such a way as to obtain a segment as illustrated in FIG. 9.

Later on, the outer tube 54 covers the insulating material 56.

Figures 10A, 10B, 10C:
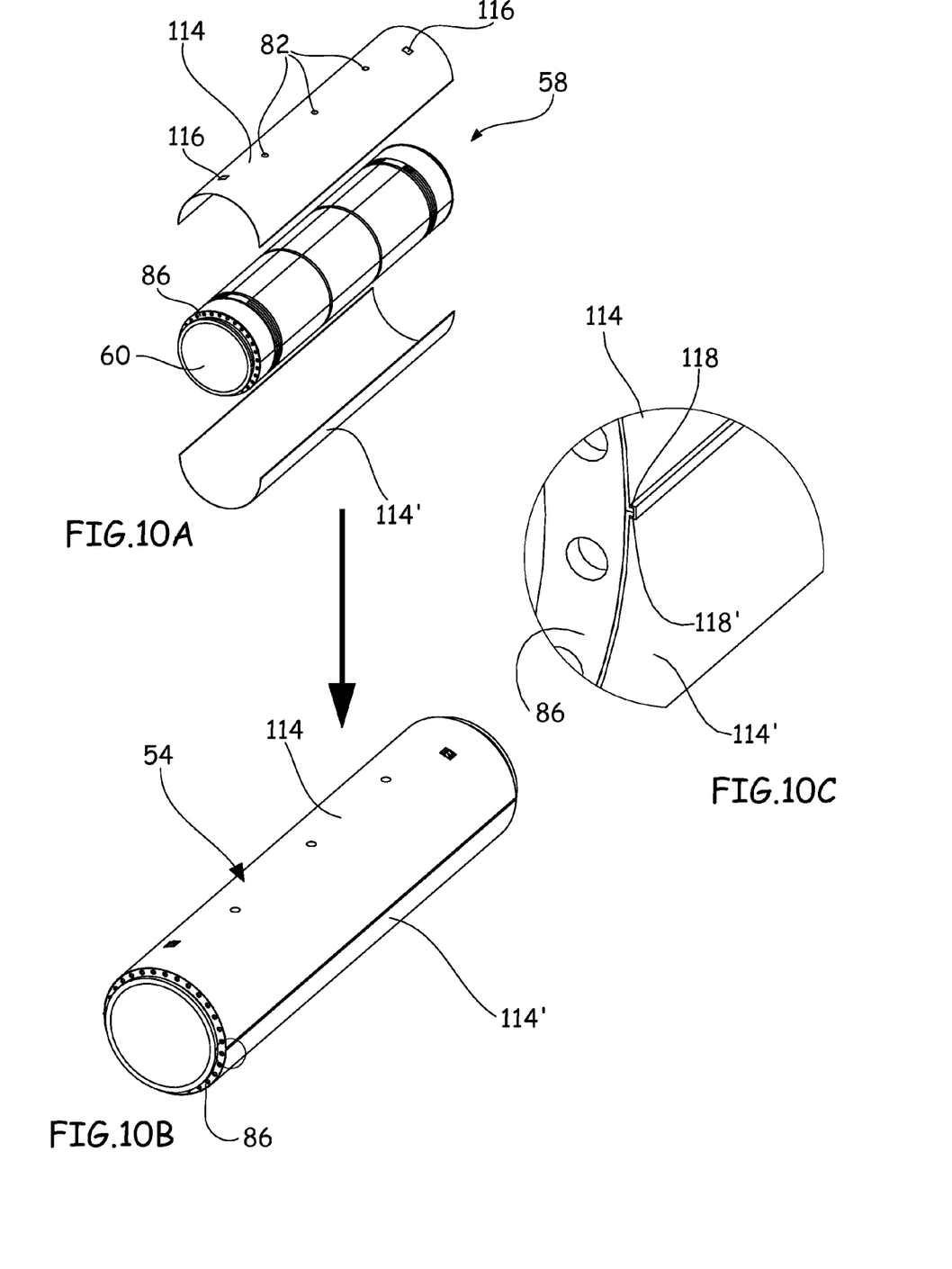
FIGS. 10A to 10C are perspective views that illustrate an outer tube and its installation on the segment of FIG. 9.

According to an embodiment that is illustrated in FIGS. 10A to 10C, the outer tube comprises two half-cylinders 114 and 114', one of them comprising openings 82 as specified above and openings 116 for making possible the passage of the connecting means RA, RA', RB and RB'.

As illustrated in FIG. 10C, the half-cylinders 114 and 114' comprise curved edges 118 and 118' that are flattened two by two and are kept assembled either by being clamped together or by being point-welded. A segment as illustrated in FIG. 11 is then obtained. Preferably, the outer tube 54 extends from one concentric ring 86 to the next and detaches each end of the segment.

The assembly of two segments is illustrated in FIGS. 12A to 12D.

Figure 12A:
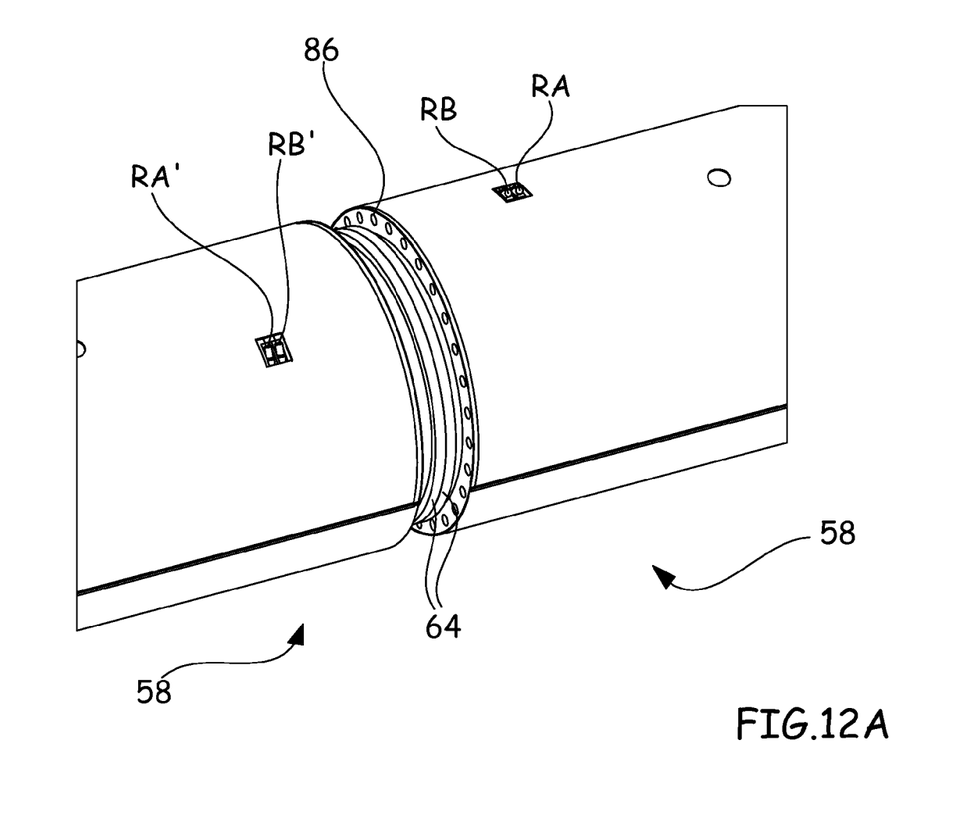
FIGS. 12A to 12D are perspective views that illustrate the connection of two segments according to the invention.
Figures 12B, 12C:
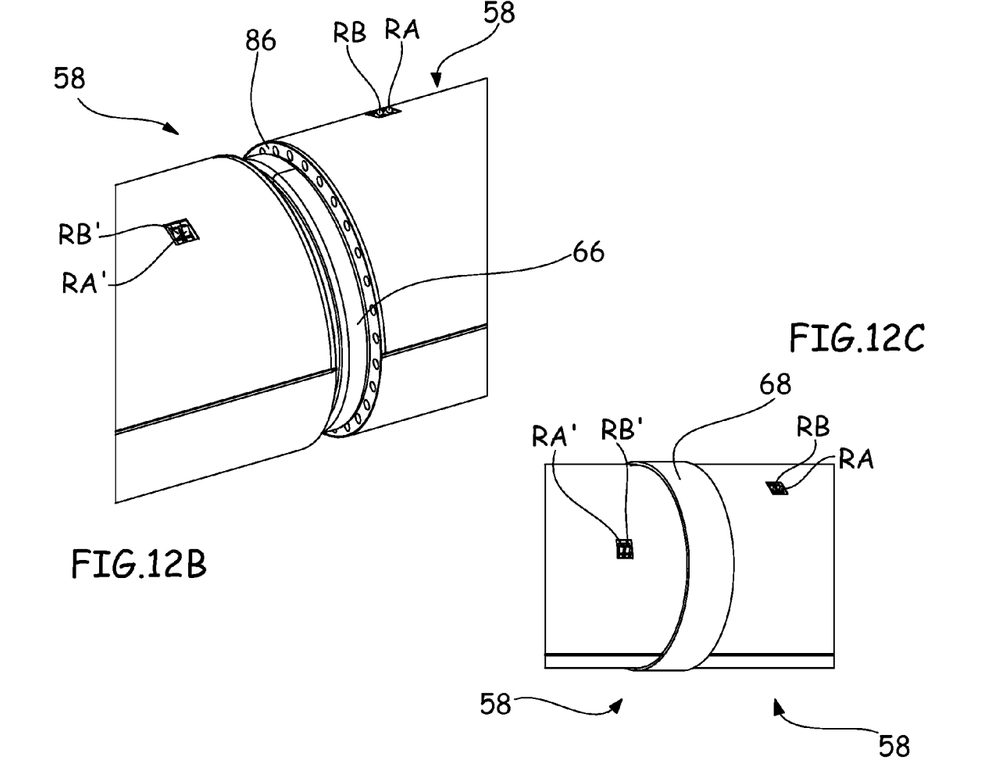
Figure 12D:
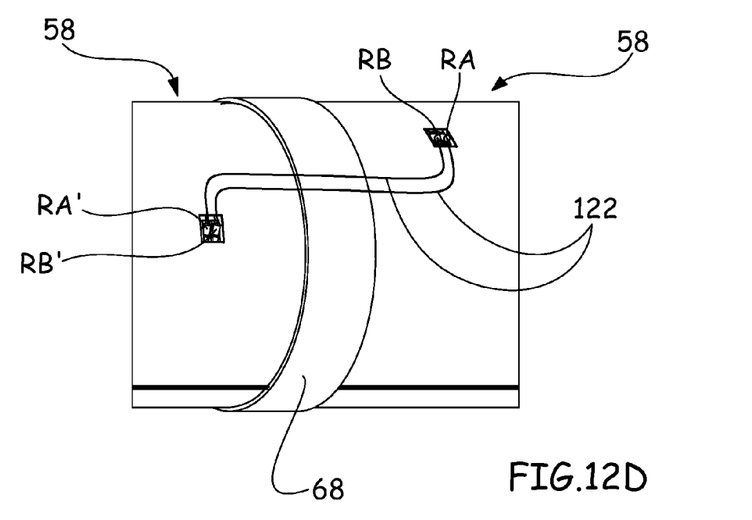

The segments are placed end to end, as illustrated in FIG. 12A. A clamp 66 clamps the collars 64 and keeps the two segments assembled as illustrated in FIG. 12B. The sleeve 68 is installed for insulating the junction zone as illustrated in FIG. 12C. Connections 122 ensure the continuity between the long-member elements A and B of the different segments. These connections 122 do not have any function in terms of leak detection and simply ensure electrical continuity between the different parts of the detection elements A and B.

The invention claimed is:

1. A pipe configured to channel pressurized air into an aircraft, comprising:
    an inner tube;
    an outer tube that is essentially coaxial to the inner tube;
    an insulating material inserted between the inner tube and the outer tube and that is made of a heat-insulating and gas-porous material;
    a leak detection device arranged at least in part between the inner tube and the outer tube and in that at least at one end, the leak detection device held in position by the insulating material follows a concentric trajectory to the inner tube, said insulating material filling the space between the inner tube and the outer tube, the leak detection device comprising two leak detection elements, each leak detection element forming a concentric loop; and
    a ring with a number of circular openings distributed over a circumference of the ring between the end and the concentric trajectory of the detection device, the circular openings being a distance from an edge of the ring, the ring being inserted between the inner tube and the outer tube and that, in case of a leak, hot air flows in the direction of the leak detection device by passing through the openings of the ring.

2. The pipe according to claim 1, wherein the concentric trajectory is arranged at an essentially constant distance from an outside surface of the inner tube and at an essentially constant distance from the end.

3. A segment of a pipe according to claim 1, comprising annular partitions made of insulating material and essentially airtight for delimiting the volume between the inner tube and the outer tube in successive annular chambers.

4. The segment according to claim 3, wherein for each chamber, the outer tube comprises an opening for linking the chamber with an outside.

5. The segment according to claim 3, wherein each detection element with has a connecting means at a first end and another connecting means at the other end.

6. The segment according to claim 3, wherein the detection device extends between the inner tube and the outer tube along an essentially rectilinear trajectory between the annual end partitions and follows a concentric trajectory to the inner tube, at each end, between the end and the annular end partition.

7. The segment according to claim 6, wherein at each end, the segment comprises the ring, placed between the end and the concentric trajectory of the detection device, with the outer tube extending from one ring to the next.

8. The segment according to claim 7, wherein the insulating material comprises, for each end, insulating rings that are concentric to the inner tube at the concentric trajectory of the detection device, at least one ring comprising a furrow for housing the detection device at the level of one of the surfaces that are perpendicular to the longitudinal direction of the inner tube.

9. The segment according to claim 3, wherein the insulating material comprises two layers between which the detection device is arranged at the level of its rectilinear path, with at least one of the layers comprising at least one furrow for housing the detection device.

10. The pipe according to claim 1, wherein the concentric trajectory is arranged at an essentially constant distance from the outside surface of the inner tube and at an essentially constant distance from the end.

11. The segment according to claim 2, further comprising a ring with a number of openings distributed over its circumference between the end and the concentric trajectory of the detection device.

12. The segment of a pipe according to claim 2, further comprising annular partitions made of insulating material and essentially airtight for delimiting the volume between the inner tube and the outer tube in successive annular chambers.

13. The segment according to claim 4, wherein the detection device extends between the inner tube and the outer tube along an essentially rectilinear trajectory between the annual end partitions and follows a concentric trajectory to the inner tube, at each end, between the end and the annular end partition.

14. The segment according to claim 5, wherein the detection device extends between the inner tube and the outer tube along an essentially rectilinear trajectory between the annual end partitions and follows a concentric trajectory to the inner tube, at each end, between the end and the annular end partition.

15. A pipe configured to channel pressurized air into an aircraft, comprising:
    an inner tube;
    an outer tube that is essentially coaxial to the inner tube;
    an insulating material inserted between the inner tube and the outer tube and that is made of a heat-insulating and gas-porous material;
    a leak detection device arranged at least in part between the inner tube and the outer tube and in that at least at one end, the leak detection device held in position by the insulating material follows a concentric trajectory to the inner tube, and the concentric trajectory is arranged at an essentially constant distance from an outside surface of the inner tube and at an essentially constant distance from the end, said insulating material filling the space between the inner tube and the outer tube, the leak detection device comprising two leak detection elements, each leak detection element forming a concentric loop; and a ring with a number of circular openings distributed over a circumference of the ring between the end and the concentric trajectory of the detection device, the circular openings being a distance from an edge of the ring, the ring being inserted between the inner tube and the outer tube and that, in case of a leak, hot air flows in the direction of the leak detection device by passing through the openings of the ring.

16. A segment of a pipe according to claim 15, comprising annular partitions made of insulating material and essentially airtight for delimiting the volume between the inner tube and the outer tube in successive annular chambers.

* * * * *